United States Patent [19]  [11] 4,432,616
Kurosaka  [45] Feb. 21, 1984

[54] FRAME FOR A PAIR OF SPECTACLES

[75] Inventor: Yoshinori Kurosaka, Suwa, Japan

[73] Assignee: Kabushiki Kaisha Suwa Seikosha, Tokyo, Japan

[21] Appl. No.: 371,902

[22] Filed: Apr. 26, 1982

[30] Foreign Application Priority Data

Apr. 27, 1981 [JP] Japan .................................. 56-63743

[51] Int. Cl.³ .............................................. G02C 1/04
[52] U.S. Cl. .................................................. 351/106
[58] Field of Search ............... 351/106, 107, 149, 152, 351/154

[56] References Cited

FOREIGN PATENT DOCUMENTS

2715755 2/1978 Fed. Rep. of Germany ...... 351/106

Primary Examiner—John K. Corbin
Assistant Examiner—Rodney B. Bovernick
Attorney, Agent, or Firm—Blum, Kaplan, Friedman, Silberman and Beran

[57] ABSTRACT

A spectacle frame holds each lens against a rim by a thin wire, providing a rimless appearance. The wire has at least one enlarged end for engagement in one end of the rim. The wire is secured at the other end of the rim for compressively retaining the lens in the rim. The length of wire supporting the lens is selectively adjustable to accommodate many lens sizes and shapes in the same frame.

19 Claims, 30 Drawing Figures

FRAME FOR A PAIR OF SPECTACLES

BACKGROUND OF THE INVENTION

This invention relates generally to spectacles, and more particularly to a partially rimless frame for a pair of spectacles wherein each lens is held along the entire pheriphery thereof by a partial rim and a thin wire. In spectacle frames of the prior art, one end of a fixed length of metal or wire is secured to a rim and each lens is held only by a slight stretching of the metallic rim. In such a construction, it is impossible to substantially adjust the dimensions of the frame to that of the lens and the lens has to be modified to satisfy the dimensions of the frame. If the lens is not modified there are the following defects, namely, suitable interference is not obtained and the lens fits loosely, or when the lens is too small or too large, the lens cannot be attached to the frame at all.

Modification of the lens generally is done in two steps. First, the lens is glazed and secondly, a groove is formed on an outer edge of the lens. When modifying the lens to adjust the dimensions to that of the frame, the optician has to operate with great care lest the lens be broken. As stated above, a pair of spectacles is not readily adaptable to modification of the lens or the frame when there is an improper fit between the two parts.

Accordingly, it would be desirable to provide a frame for a pair of spectacles which provides for simple dimensional modification so as to accommodate a wide range of lens sizes and shapes.

SUMMARY OF THE INVENTION

Generally speaking, in accordance with the invention, a spectacle frame wherein the lens is retained within a rim by a thin wire is provided. A groove is formed around the outer peripheral edge of the lens and a protrusion on the rim engages the groove on the upper edge as does the wire engage in the groove on the lower edge. The effective length of the wire is variable and the point of attachment of the wire to the rim may be varied so as to acommodate a wide range of len's sizes for attachment to the rim. The spectacle frame includes a rim having temples extending therefrom supporting the spectacles on the wearer's ears. A thin wire across the bottom portion of the lens, concealed in a groove, holds the lens to the rim of the frame. The wires are formed with enlarged ends. One end of the rim includes a plurality of receptacles for receiving therein an enlarged end of the wire and the other end of the frame includes a securing member wherein the second end of the wire is adjustably secured after the lens is inserted into the rim.

Accordingly, it is an object of the invention to provide an improved frame for a pair of spectacles which can accommodate a wide range of lens sizes and shapes.

Another object of the invention is to provide an improved frame for a pair of spectacles which holds the lens against a rim by means of a tensioned wire.

Still another object of the invention is to provide an improved frame for a pair of spectacles wherein the means for retaining the lower edge of the lens is invisible from the front of the spectacles.

Still a further object of the invention is to provide an improved frame for a pair of spectacles which can be fitted with various sizes and shapes of lenses without the need to modify the lens itself.

Still other objects and advantages of the invention will in part be obvious and will in part be apparent from the specification.

The invention accordingly comprises the features of construction, combination of elements and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
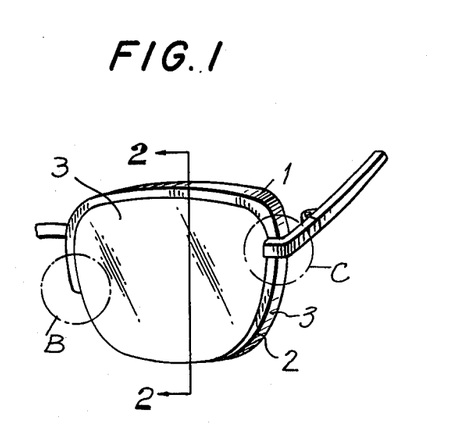
FIG. 1 is a partial perspective view of a frame for a pair of spectacles in accordance with the invention.
Figure 2:
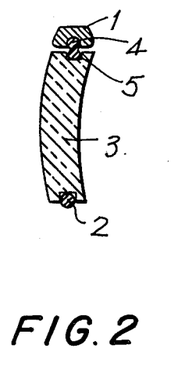
FIG. 2 is a sectional view taken along the line 2—2 of FIG. 1.

FIG. 1 is a partial perspective view of a frame for a pair of spectacles in accordance with the invention and FIG. 2 is a sectional view taken through FIG. 1 along the line 2—2. In FIGS. 1 and 2, the frame for a pair of spectacles includes a rim 1, a wire 2, lens 3, and a convex element 4 engaged with the rim 1 and extending therefrom. A groove 5 is formed on the outer edge of the lens 3 and the lens 3 is held in position as follows. The groove 5 on the upper half of the lens 3 is engaged by the convex portion 4 and the groove 5 on the lower half of the lens receives the wire 2 therein. The ends of the wire 2 are connected to the rim 1 at the regions B and C as described more fully hereinafter.

Figure 3A:
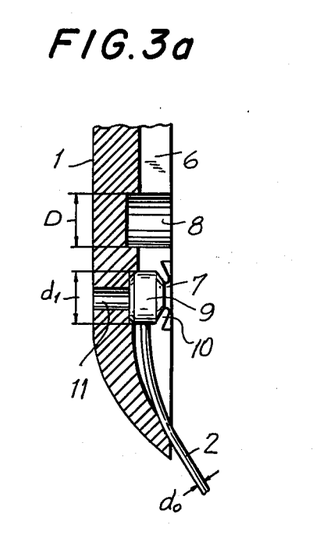
FIGS. 3a and 3b are respectively a front sectional view and a side view of a portion B of FIG. 1.
Figure 3B:
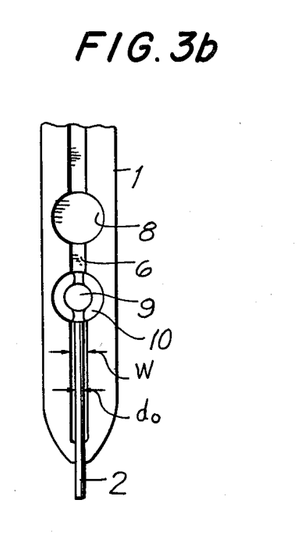

A detailed description of a construction of the portion B in accordance with the invention is now provided with reference to FIGS. 3a and 3b which are respectively a front section view and a side view. A groove 6 and engagement holes 7, 8 are formed in the inner surface of the rim 1. Also, engagement means 9 is formed at the end of the wire 2. The engagement means 9 is an enlargement at the end of the wire 2.

The wire 2 engages the rim 1 by securing the engagement means 9 formed at the end of the wire 5 in either of the engagement holes 7, 8 as the wire 2 extends along the perimeter of the lens 3. In FIGS. 3a, b, the wire 2 is firmly secured to the rim 1 by staking means 10.

At the bottom of the engagement hole 7, a hole 11 is formed extended through the outer surface of the rim 1. This hole 11 is used as a guide hole when a wire 2 is engaged with the rim 1 and is also used when the wire is passed through with a punch. The wire 2 is engaged with either of the holes 7, 8 by pushing the engagement means 9 therein, and after the engagement means has been pushed into the opening, the wire 2 is secured to the rim 1 by staking or by means of a bonding adhesive.

When the wire diameter is $d_0$, the diameter of the engagement means 9 at the end of the wire 2 is $d_1$, the diameter of the engagement holes 7, 8 is D, and the width of the groove 6 formed on the rim 1 is W, then the dimensions of an engaged portion between the rim 1 and the wire 2 is expressed as $d_0 < W < d_1 \approx D$.

It should be understood that the number of engagement holes 7, 8 formed in the rim 1 is not limited to two and a plurality of holes is available in alternative embodiments. Also, it is practical to provide a hole 11 not only in the engagement hole 7 but also in all of the engagement holes which may be provided.

Figure 4A:
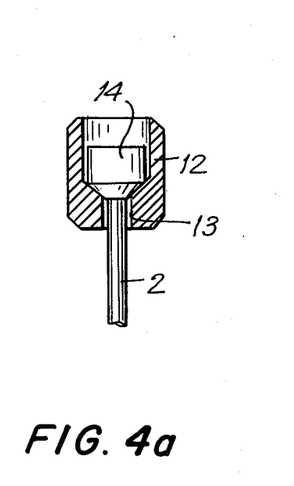
FIGS. 4a, b are a front sectional and side view respectively of a portion of a wire of FIG. 1.
Figure 4B:
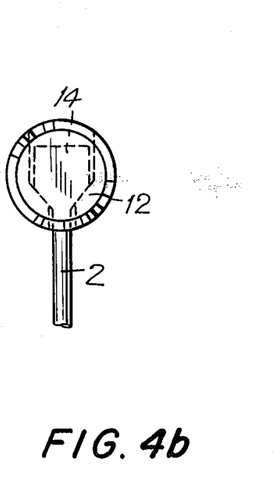

An alternative embodiment of engagement means connected to the wire 2 is shown in FIGS. 4a,b, a front and side view respectively. A fixing member 12 is used to form an engagement means 9 at the end of the wire 2. The end of the wire 2 has an enlarged portion 14 which is somewhat larger than a hole 13 in the fixing member 12 so that the wire once inserted through the opening 13 is not readily withdrawn.

As described above, a frame for a pair of spectacles in accordance with the invention has a structure wherein engagement means at the end of a wire can be engaged with any of a plurality of engagement holes formed on a rim so that the following effects are provided. First, because a wire can engage with a rim at any of several locations with ease, it is possible to adjust the perimeter of the frame to correspond of that of the lens. Each lens can fit easily to a frame and suitable interference of the lens is obtained without high accuracy in controlling the perimeter of the lens when the lens is produced. Secondly, as the perimeter of the frame can be adjusted to correspond with that of the lens, the lens is limited only on one surface of the frame and the other contours of the lens can be varied widely as the user desires, and generally speaking, a pair of spectacles can be designed with great ease.

Figure 5A:
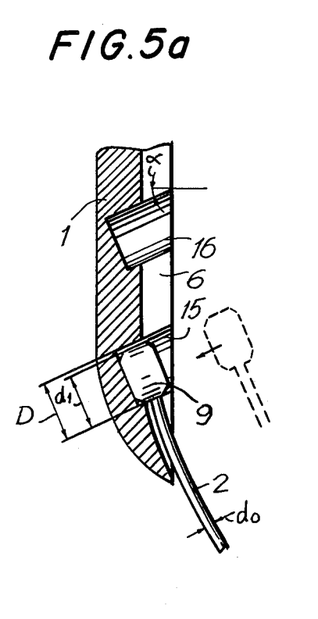
FIGS. 5a, b and 6 are views similar to FIG. 3 of an alternative embodiment in accordance with the invention.
Figure 5B:
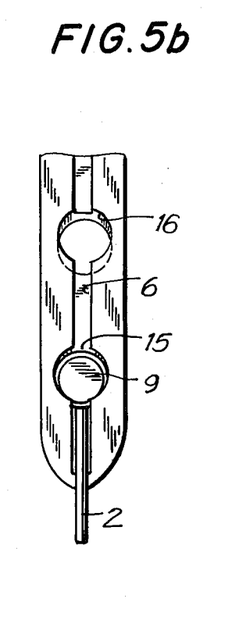
Figure 6:
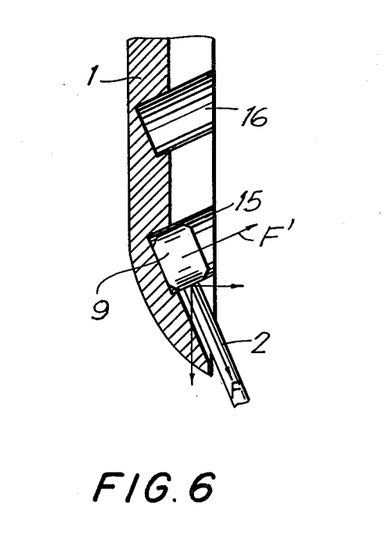

FIGS. 5a,b, illustrate another alternative embodiment of the portion B (FIG. 1) wherein a wire 2 is joined to a frame 1. In this embodiment, a groove 6 is formed on the inner surface of a rim 1 and engagement holes 15, 16 are provided at an angle $\alpha$ to the inner surface of the rim 1. Engagement means 9 is formed at the end of a wire 2 in the same manner as in the embodiments of FIGS. 3 and 4. The wire 2 is adjusted to the perimeter of a lens and then an engagement means 9 at the end of the wire 2 is engaged, working from the inner surface of the rim 1, to either one of the engagement holes 15, 16. Thereby, the wire 2 is engaged with the rim 1. When the diameter of the engagement means 9 is taken as $d_1$ and the diameter of the engagement holes 15, 16 in the rim 1 are taken as D, then a relationship between $d_1$ and D is expressed as $D > d_1$. Other physical relationships are the same as presented with reference to the embodiment of FIG. 3.

The above described embodiments have the same advantages as the embodiment shown in FIG. 3. Further, as this embodiment has a relationship, $D > d_1$, the wire 2 can be attached and detached to and from the holes 15, 16 on the rim 1 with ease. Furthermore, as the engagement holes 15, 16 are at an angle $\alpha$, after the lens 3 is fitted, dividing forces of the tension force F of the wire 2 do not act in the direction indicated by the arrow F'. Thus, there is no force which acts in the direction of the arrow F' which would tend to cause the engagement means 9 to fall out of the engagement holes 15, 16. Therefore, it is unnecessary to secure the engagement means 9 in either of the holes, 15, 16 by staking or by means of bonding adhesive. Thus, such a frame construction is easy to work with.

Figure 7A:
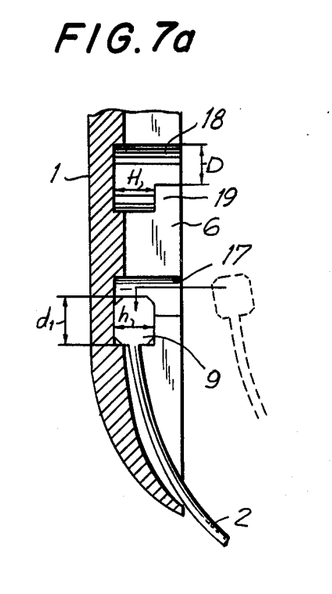
FIGS. 7a, b and FIGS. 8a, b are views similar to FIG. 3 of alternative embodiments in accordance with the invention.
Figure 7B:
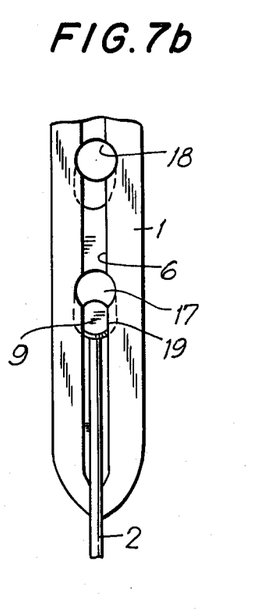

FIG. 7a is a front sectional view and FIG. 7b is a side view of an alternative embodiment of a frame for a pair of spectacles constructed in accordance with the invention. In the embodiment in accordance with FIGS. 7a,b, a groove 6 and engagement hole 17, 18 are formed on the inner surface of a rim 1. The engagement holes 17, 18 have an L-shape in that the inlet opening to the hole 17, 18 is less than the cross-sectional area at the base of the hole. Engagement means 9 are provided at the end of a wire 2 in the same manner a described with reference to the embodiments of FIGS. 3 and 4.

When the wire 2 is engaged with a rim 1, the engagement means 9 at the end of the wire 2 is inserted by finger pressure into either of the holes 17,18 and then wire 2 is drawn in the direction of the arrowhead, that is, toward the lower end of the rim 1 as shown in FIGS. 7a,b. Thus, the engagement means 9 of the wire 2 is set in one of the holes 17, 18. A wall or shoulder 19 of the rim 1 formed as a result of the L-shape of the hole 17, 18 prevents the engagement means 9 form falling out of the hole toward the inside, that is, the lens side of the rim.

When the diameter of the engagement means 9 at the end of the wire is $d_1$, thickness of the engagement means 9 is h, diameter of the engagement hole 17, 18 having the L-shape is D, and depth of the engagement hole is H, the dimension of the engagement portion between the rim 1 and the wire 2 is expressed as $D > d_1$, $H > h$. Other dimensions are the same as in the embodiment of FIG. 3. The embodiment of FIGS. 7a, b, provides the same excellent results as that of the embodiment in accordance with FIG. 5.

Figure 8A:
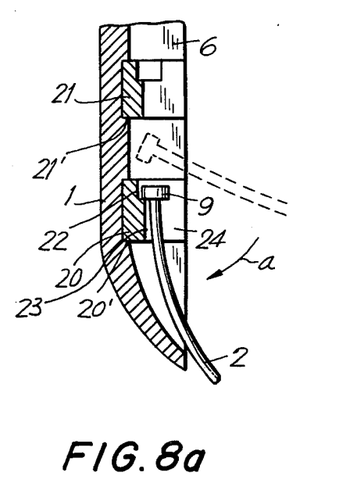
Figure 8B:
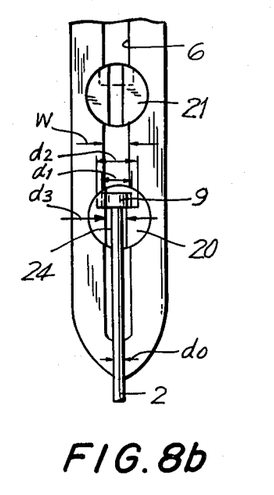

Another alternative embodiment of a frame construction for a pair of spectacles in accordance with the invention is shown with reference to FIGS. 8a and 8b, which are a front sectional view and side view respectively. In the embodiment of FIGS. 8a, b, a groove 6 and holes 20', 21' for engagement are provided on the inner surface of a rim 1. Fixing means 20, 21 seat within the holes 20', 21' respectively and the fixing means have a recess 22 in which the engagement means 9 at the end of a wire 2 is held. The fixing means 20, 21 also include a hole 23 having a diameter somewhat larger than that of the wire 2 and a slit groove 24 having a width which is the same as the diameter of the hole 23. The fixing means 20, 21 are respectively adhered to the holes 20', 21'.

When the diameter of the wire 2 is $d_0$, diameter of the engagement means 9 is $d_1$, diameter of the hole 22 is $d_2$, diameter of the hole 23 and width of the slit groove 24 is $d_3$, and width of the groove 6 is w, the dimensional relationships between the rim 1, fixing means 20, 21 and the wire 2 are expressed as $d_0 < d_3 < d_1 < w \leq d_2$.

The wire 2 is engaged with the rim 1 as follows. First, the wire 2 is adjusted in length for the perimeter of the lens to be mounted and then either of the fixing means 20 or 21 is selected. Second, the engagement means 9 is pushed into the groove 6 of the rim. Third, for example, when selecting the fixing means 20, the wire 2 is pulled in the direction of the arrow a and then the engagement means 9 is received in the hole 22 of the fixing means. Because the relationship between the diameter $d_1$ of the engagement means 9 and the width d of the hole 23 is $d < d_1$, the wire 2 does not fall off the inner surface of the rim. Accordingly, a frame having such an engagement construction has high reliability in holding the lens in place.

Figure 9:
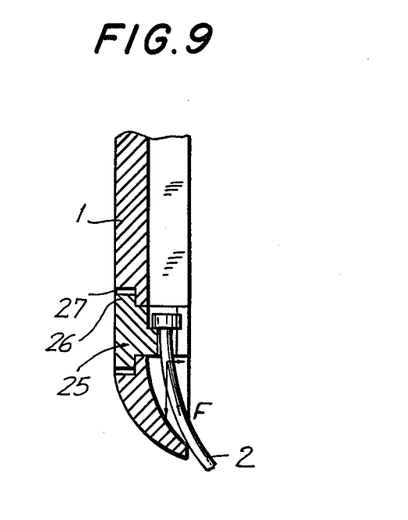
FIG. 9 is a front sectional view of an alternative embodiment of portion B of FIG. 1 in accordance with the invention.

FIG. 9 illustrates a practical application of the concepts of FIG. 8. In FIG. 9, a fixing means 25 has a collar or flange 26 and the rim 1 has an external milled recess 27 in which the collar 26 is recessed. Thereby, a fixing means, such as fixing means 20 of FIG. 8 cannot separate from the rim toward the inside of the rim 1. In such a construction, the pulling force F caused by the wire 2 is as shown in FIG. 9 and there is no component of force that can cause the fixed means 25 to move off the rim 1 toward the inside of the rim. Therefore, it is not necessary to provide staking or adhesive bonding to hold the fixed means 25 in place.

The embodiments of FIGS. 8 and 9 provide the same advantageous results as the embodiment of FIG. 5.

Figure 10A:
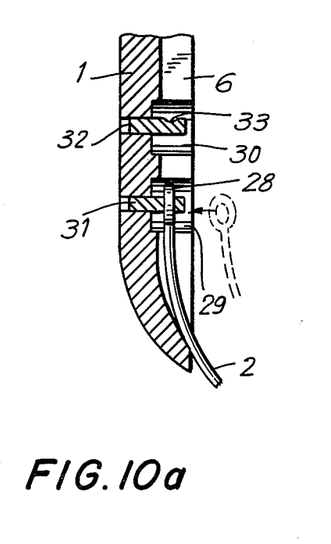
FIGS. 10a, b are views similar to FIG. 3 of an alternative embodiment in accordance with the invention.
Figure 10B:
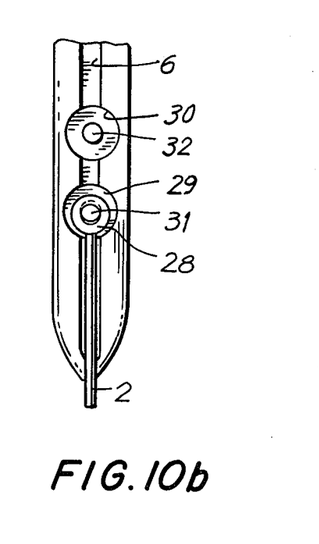

FIG. 10 is another alternative embodiment showing the connection of a wire 2 to a rim 1 in the portion B of FIG. 1 in accordance with the invention. In the embodiment of FIG. 10, wherein FIG. 10a is a front sectional view and FIG. 10b is a side view, a groove 6 is formed on the inner surface of the rim 1 and pins 31, 32 are each inserted into a hole passing through the rim. The through holes are each concentric with one of the engagement holes 29, 30 formed on the rim 1. A pin 31, 32 is inserted into each through hole for hanging a wire 2 selectively thereon.

The wire 2 has a ring 28 at the end thereof and the length of the wire 2 is adjusted to the perimeter of a lens. Then the ring 28 at the end of the wire 2 is fitted into either of the pins 31, 32 as suits the frame. At that time, the ring 28 is fitted into a notch 33 formed on the pins 31, 32 such that the ring 28 does not fall off the pin in the directional of the inner surface of the rim, that is, in the direction of the lens. The embodiment of FIGS. 10a, b has the same superior characteristics as the embodiment of FIG. 5.

In the above described embodiments of FIGS. 3–10, a frame for a pair of spectacles in accordance with the invention is comprised of a wire having engagement means at one end and a rim having plural engagement holes. As a result, each lens can fit easily into the frame and suitable interference with the lens is obtained without high accuracy in controlling the perimeter of the lens during its production. This is possible when the wire is comprised of a super elastic material and the engagement portion on the rim can be selected readily to fit a finished lens. Because the perimeter of the frame is adjusted to fit a finished lens by having a plurality of engagement holes thereon, the shape of the lower half of the lens held by a wire is not restricted to only one shape, and any shape of a large variety selected by a user is available. Thus, a frame for a pair of spectacles in accordance with the invention has the advantage that the number of lens designs which can be accommodated is greatly expanded.

Figure 11A:
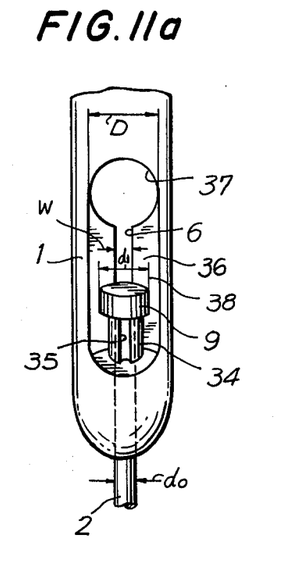
FIGS. 11a, b are views similar to FIG. 3 of an alternative embodiment in accordance with the invention.
Figure 11B:
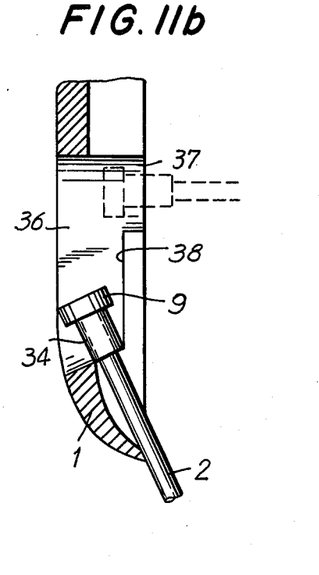
Figure 12:
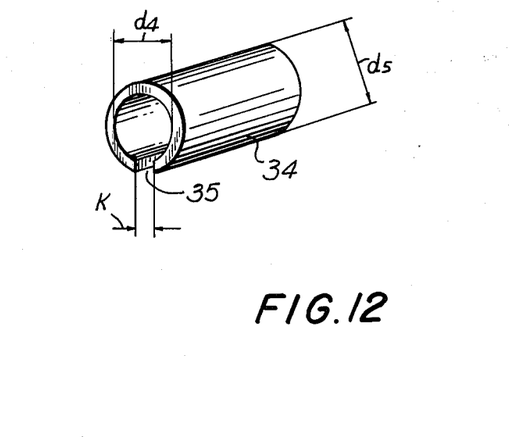
FIG. 12 is a perspective view, to an enlarged scale, of a component of the embodiment of FIGS. 11a, b.

Whereas in the embodiments described above, different lenses are accommodated in a common frame by means of a plurality of engagement holes in the rim for receiving one end of the wire, the following description is of a frame wherein means are provided for adjusting the length of the wire where the wire and rim are engaged. With reference to FIGS. 11 and 12, wherein FIG. 11a is a side view and FIG. 11b is a front sectional view, a groove 6 is formed on the inner surface of a rim 1 and a concave or hollow portion 36 is formed into the outer surface of the rim. A hole 37 passes through a portion of the concave portion 36 of the rim 1 from the outer surface to the inner surface. Accordingly, as illustrated in FIG. 11, a portion corresponding to the hole 37 and the groove 6 is exposed and each side of the opening corresponding to the groove 6 has a wall surface 38. A wire 2 includes an engagement means 9 at the end and has a collar or pipe 34 having a split groove 35.

When the diameter of the wire 2 is $d_0$, diameter of the engagement means 9 is $d_1$, inner diameter of the pipe 34 is $d_4$, outer diameter of the pipe 34 is $d_5$, width of the split 35 is K, diameter of the hole 37 is D, and width of the groove 6 is w, the dimensional relationships are expressed as $K < d_0 \leq d_4 < W < d_5 \leq d_1 < D$.

Accordingly, in assembly, the split groove 35 is first expanded and then the pipe 34 is engaged with the base of the engagement means 9 formed at the end of the wire 2. As described above, a relationship between $d_0$ and $d_4$ is $d_0 \leq d_4$. Thus, after engagement of the pipe 34 with the wire 2, the width K of the split groove 35 returns to its original shape as a result of the spring-like qualities of the pipe 34. At that time, as the relationship between the width K and the diameter of the wire 2 is $K < d_0$, the pipe 34 remains engaged with the wire 2. When dismantling the pipe 34 from the wire 2, this is accomplished by expanding the split groove 35 within the elastic limits of the pipe 34.

Next, the wire 2 having the pipe 34 attached is engaged with the rim as follows. First, the wire 2 is inserted in the rim from the inner surface as shown by the broken line in FIG. 11b and then the engagement means 9 and pipe 34 are slipped to the lower portion of the recess 36 as shown in the solid lines (FIG. 11b). The wall surface 38 prevents the wire from slipping out of engagement with the rim. By selecting the length of the pipe 34 the effective length of the wire is varied. In this way many different lens shapes can be accommodated using the same rim 1. The wire 2 is disconnected from the rim 1 by operations which are opposite to the procedural steps used in connecting the wire with the pipe 34 to the rim 1.

The embodiment of FIGS. 11, 12 provides adjustment to the perimeter of a frame by changing the length of the pipe 34 or entirely removing the pipe 34 in accordance with the perimeter and the lens. This embodiment produces the same results as the embodiments of FIGS. 3 to 10 and further, because the rim 1 needs only one engagement portion, the rim 1 can be easily manufactured and in this respect it is an excellent embodiment.

The above description related to the portion B of FIG. 1, but it should be understood that the embodiments of FIGS. 3–12 can also be applied to the other portion C of FIG. 1.

Figure 13A:
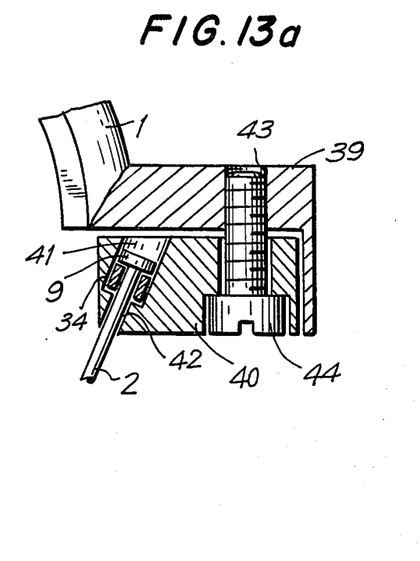
FIGS. 13a, b are a front sectional and bottom view of the portion C of FIG. 1 in accordance with the invention.

Embodiments of a construction of the portion C in FIG. 1 are now described in detail. FIGS. 13a, b illustrate an embodiment including support means 39 integral with the rim 1 and having an internally threaded portion 43. As described above, engagement means 9 is formed at the end of a wire 2 and a pipe 34 having a split groove as illustrated in FIG. 12, is engaged with the wire 2. A fixture 40 includes a hole 41 for holding the engagement means 9 at the end of the wire 2 and another hole 42 concentric with the hole 41 through which the wire 2 passes. The fixture 40 is attached to the support means 39 by means of a small machine screw 44 which engages the threaded portion 43 of the support means 39. Engagement and disengagement between the wire 2 and the pipe means 34 is accomplished in the manner described with relationship to the embodiments of FIGS. 11 and 12.

Figure 13B:
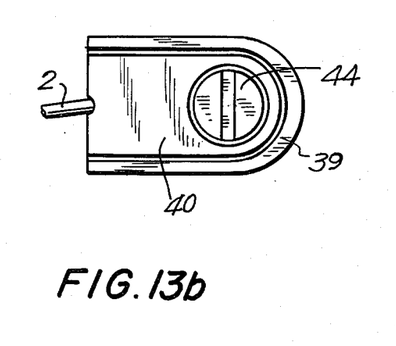

As described above, these embodiments provides for an adjustment of the perimeter of a frame, that is, rim and wire, by changing the length of the pipe 34 or by slipping the pipe 34 off the wire 2 in accordance with the perimeter of the lens. Thereby, suitable interference between the frame and the lens is obtained. Thus, this embodiment has the same advantages as the embodiments of FIGS. 3 to 12. Further, as the pipe means 34 for adjustment of the perimeter of the frame is held in the hole 41 formed in the fixture 40, the pipe means is not visible from the outside of the fixture 40 and the appearance is attractive.

Figure 14:
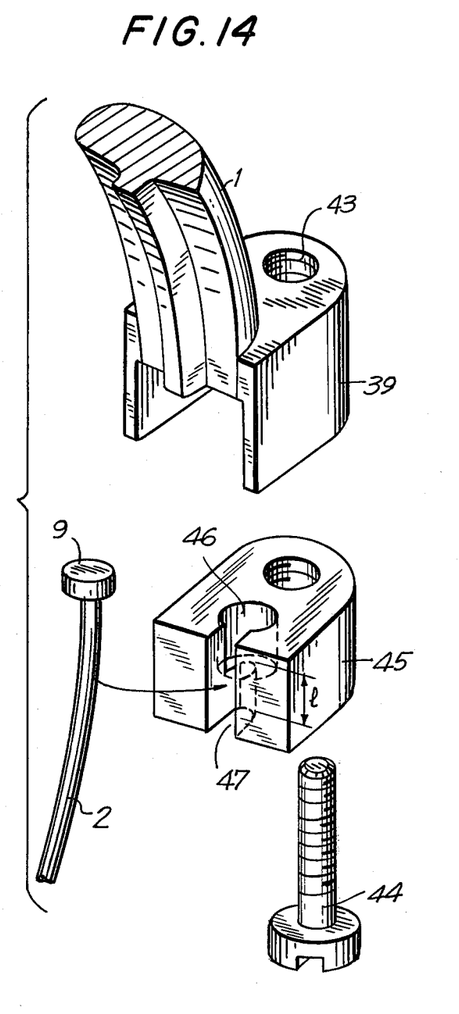
FIG. 14 is an exploded perspective view to an enlarged scale of the portion C in FIG. 1 in accordance with the invention.

As illustrated in FIG. 14, support means 39, having an internally threaded portion 43, is fixed at the end of the rim 1. Engagement means 9 is formed at the end of the wire 2. A fixture 45 includes a concave portion 46 in which the engagement means 9 at the end of the wire 2 is fixed and a gap 47 through which the wire tube passes. The fixture 45 is attached to the support means 39 by a screw 44 which engages the threaded portion 43 of the support means 39. Because the diameter of the engagement means 9 is larger than that of the gap 47, the wire 42 does not slip out of the fixture 45 once the engagement means 9 is positioned in the concave portion 46.

Adjustment is made to the perimeter of a lens by having support means 45 prepared with different lenghts l in advance and replacing the support means 45 so as to select a proper length l in accordance with the perimeter of the lens. Thereby, suitable interference between the lens and the frame is easily obtained. The wire 2 is engaged with the support means 45 by inserting the wire through the gap 47 in the direction of the arrow and by fixing the engagement means 9 of the wire 2 in the concave portion 46.

Figure 15:
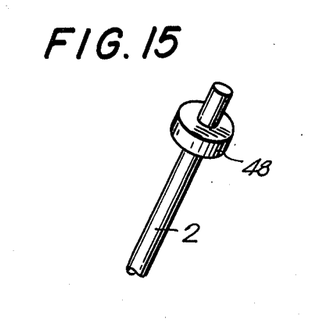
FIG. 15 is a perspective view to an enlarged scale of an alternative embodiment of a wire engagement means in accordance with the invention.

A wire as shown in FIG. 15 provides a construction for adjusting the length of the lens perimeter support. Otherwise, the construction is similar to that in the embodiment of FIG. 14. In FIG. 15, an engagement means 48 is penetrated by the wire 2 and the engagement means 48 is fixed to the wire at a suitable position to provide the proper length of wire for the lens perimeter. Accordingly, the lens perimeter is adjusted as follows, namely, the wire 2 is cut after fitting to the perimeter of the lens and the engagement means 48 is fixed to the wire. Thereby the length of the wire is suitably adjusted. Using engagement means 48 on the wire 2 obviates the need to have an assortment of different support means 45 having different lengths of l as shown in FIG. 14. Accordingly, only one support means 45 is required.

Figure 16A:
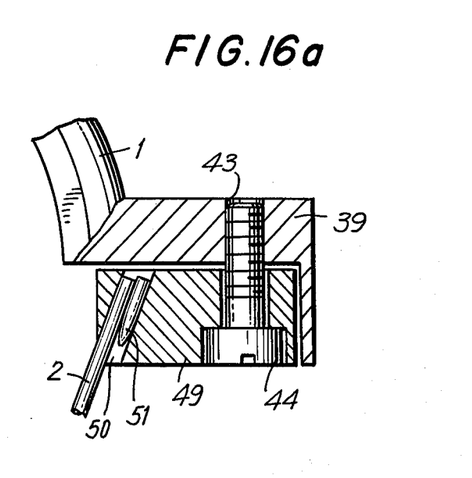
FIGS. 16a, b are views similar to FIGS. 13a, b of an alternative embodiment in accordance with the invention.
Figure 16B:
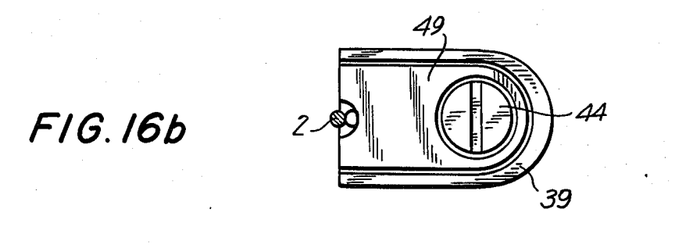

FIG. 16 illustrates another embodiment in accordance with the invention for obtaining suitable interference between the lens and frame by changing the length of the wire itself. FIG. 16a is a front sectional view and FIG. 16b is a bottom view. In this embodiment, a support means 39 having an internally threaded portion 43 is fixed at the end of the rim 1. A fixture 49 is penetrated by a hole 50. The wire 2 passes through the hole 50 and additionally, a wedge 51 is pressed into the hole 50, whereby the wire 2 is engaged with the fixture 49.

The fixture 49, with which the wire 2 is engaged by means of the wedge 51, is attached to the support means 39 by means of a screw 44 which is recessed in the fixture 49 and threadably engages the threaded portion 43 of the support means 39. The overall perimeter of the frame is adjusted by cutting a long wire, prepared in advance, after fitting the wire to the finished perimeter of the lens. The hole 50 in the fixture 49 performs the intended purpose satisfactorily even when the hole 50 is circular with a straight bore. However, even better engagement is provided when the hole 50 is circular and has a taper matched to the taper of the wedge 51. Thus, in this embodiment (FIG. 16) using a wedge, the wire is very firmly fixed. Further, the wire 2 is mechanically fixed by wedging and accordingly, if there is any difficulty with the wire, the wire can be replaced readily by pulling out the wedge. As described above, this embodiment is excellent for purposes of making repairs and the holding fixtures and wedge can be used again. Thus, the cost of repairs is also very favorable.

Figure 17:
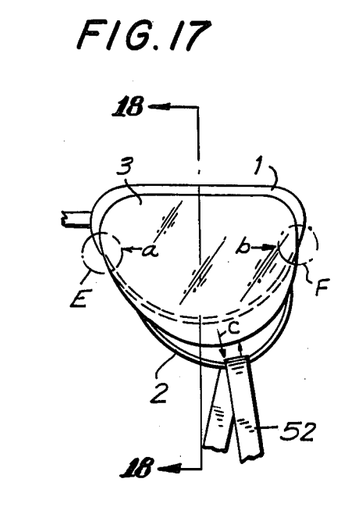
FIG. 17 is a front view indicating assembly methods for an alternative embodiment of a frame for a pair of spectacles in accordance with the invention.
Figure 18:
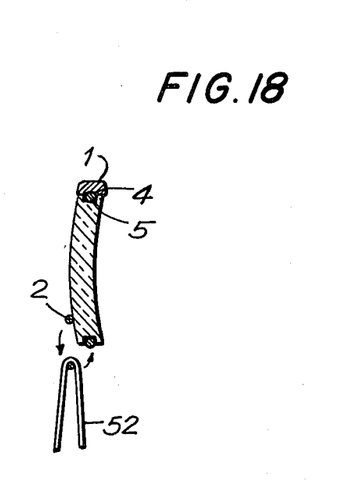
FIG. 18 is a sectional view taken along the line 18—18 of FIG. 17.
Figure 19:
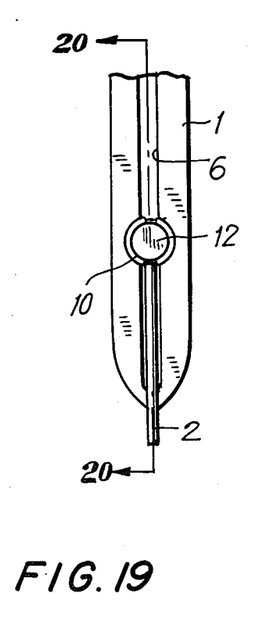
FIGS. 19 and 20 are side and front sectional views respectively to an enlarged scale of engagement means of FIG. 17.
Figure 20:
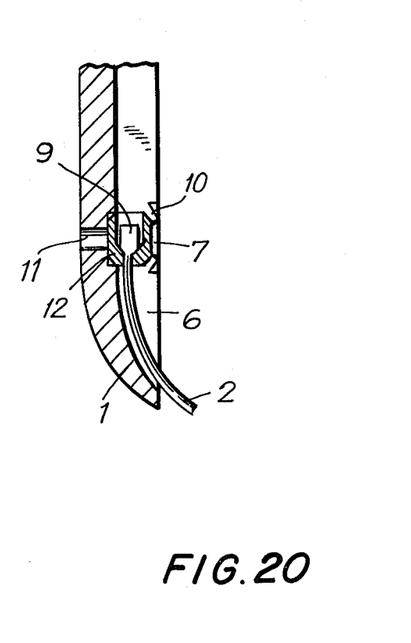

The descriptions above related to FIGS. 13–16 are embodiments for construction in the portion C as shown in FIG. 1. Now, embodiments are described wherein the perimeter of the frame is adjusted to match the perimeter of the lens not by a mechanical construction of the wire but by using a wire having an inherent adjustment capacity. With reference to FIGS. 17 and 18, a wire 2 is comprised of a superelastic material engaged with both ends of the rim 1, that is, at the portions E and F of FIG. 17. The upper half of a groove 5 on the outer edge of a lens 3 engages with a convex portion of the rim 1 as desribed above, and the lower half of groove 5 engages with the wire 2 which, as stated, is also engaged with the portions E, F. Thereby the lens 3 is held in position relative to the rim 1. FIGS. 19 and 20 are views of the portions E and F. Both portions are represented by the same view when looking at the portions from the direction of the arrow a or the arrow b (FIG. 17). FIG. 20 is a sectional view along the line 20-20 of FIG. 19.

A groove 6 and an engagement hole 7 are formed on the inner surface of the rim 1. An engagement means 9 at the end of the wire 2 is engaged with of fixing member 12 in the same manner as in the embodiment of FIG. 4. The wire 2 is connected with the rim 1 as follows. The fixing means 12, which is fixed at the end of the wire 2 is pushed into the engagement hole 7 from the inner surface of the rim. In order to improve the attachment of the wire 2, staking 10 is provided as shown in FIG. 20. Further, a hole 11 passes through the rim 1 and is formed concentrically with the engagement hole 7. The hole 11 is used as a guide hole when the wire 2 is engaged with the rim and also serves as a cavity when the wire is pulled out. Engagement between the rim 1 and wire 2 is also possible by brazing techniques and this is a simple method of attachment.

The wire used for this embodiment (FIGS. 17-20) is a compound of the metals nickel (Ni) and titanium (Ti). This Ni-Ti alloy contains 51 atomic percent of nickel. The wire has a diameter of 0.2 mm and a length of approximately 80 mm and is provided with a stable superelastic property by heat treatment at 700° to 900° C. in a vacuum.

Figure 21:
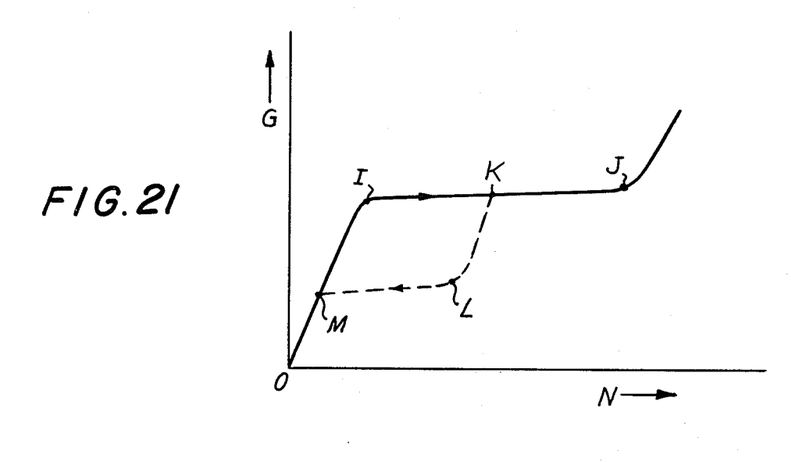
FIG. 21 is a force-elongation characteristic of the wire of FIGS. 17-20.

FIG. 21 shows the tensile properties of the wire 2, wherein the tensile load G in kilograms is shown along the ordinate axis and elongation N in percent is shown along the abscissa axis. At a point I, where elongation is 5%, the tensile load is 2 kilograms. A martensite transformation is started by the stress, beginning at this point I. From the point I to the point J, where elongation is 10%, and where the transformation is to be stopped, the wire 2 is stretched with a tensile load of 2 kilograms, that is, elongation continues with the same loading in the region between the points I and K. In the range beyond the point J, plastic elongation occurs. At a selected point K between the points I and J, when the load is decreased so that it is 1 kilogram at the point L, a martensite transformation begins and at a constant load of 1 kilogram the elongation diminishes to the point M where the martensite transformation due to stress is stopped. When the load is further decreased, the elongation returns to the origin O.

Thus, substantial elongation of the wire is possible without permanent deformation of the wire.

The lens 3 is engaged to a frame as follows (FIGS. 17, 18). First, the groove 5 formed on the upper half of the lens 3 is engaged with the convex portion 4 of the rim 1, as described in relation to the embodiments above. Second, after passing a thin tape 52 as a loop through the wire 2, the wire 2 is stretched in the direction of the arrow C, namely, to the outer edge of the lens 3 and then the wire 2 is engaged in the groove 5 formed on the lower part of the lens 3. The length of the wire 2, prior to engagement with the lens 3, must be somewhat shorter than the perimeter of the lens 3 in that portion where engagement between the lens and the wire is accomplished.

In actuality, in the range (FIG. 21) from the origin O to the point J, the wire 2 has a superelastic property so that when the load is decreased, the elongation always is returned to the origin O. In this embodiment, the length of the wire 2 is 80 mm and it can be stretched by a maximum of 8 mm without permanent deformation. Accordingly, the perimeter of the frame including both the rim and the wire should be less than that of the lens in the order of magnitude of 8 mm. Further, the load for pulling the wire 2 with the thin tape 52 is not large, but only 2 kilograms. Further, this load is constant until the wire stretches to the desired length of 8 mm. Accordingly, the wire can be stretched by an operator by hand without using mechanical tools or methods, such as a screw, or the like.

As described above, the wire in accordance with the invention has superelastic properties under the condition of low load. This wire is used for engaging with the rim and then to a lens which is fitted to the frame by pulling the wire so that the wire may be extended around the lower edge of the lens. The following results are achieved.

First, as the wire stretches easily by 10% under a low load, in manufacturing the lens, in particular, in shaping the lens and providing the edge groove, the lens can be produced without high accuracy in controlling the lens perimeter, and the lens is still easily fitted. Also, this is effective in the process of producing the frame, that is, there is no need for high accuracy in constrolling the dimensions of the frame when the wire is readily stretched. Thus, productivity is remarkably improved.

Second, the perimeter of a frame can be greatly varied by using the characteristic of the wire that it readily stretches by as much as 10%. As stated above, one frame, fitted with this wire, offers a high degree of freedom in its design because the shape of the lower part of the lens held by the wire is not restricted to only one type and can be easily adapted to the user's preferences and requirements.

Third, even if the lens expands and contracts with temperature changes, the wire also expands and contracts along with the perimeter of the lens and the lens is held with a constant force under these varying conditions.

Fourth, when using the superelastic wire, the completed frame requires no parts such as the fixtures, support means, screw, etc., for engaging the wire with the rim. Thus, a frame which is low in cost, lighter in weight, and offers a high degree of freedom in manufacture and in assembly of various lenses, is offered.

In summary, a frame for a pair of spectacles in accordance with the invention provides for perimeter variations in the frame in accordance with the perimeter of the manufactured lens so that the lens is suitably held regardless of wide variations in size and shape. This is extremely valuable in practical applications in construction of spectacles.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A frame for a pair of spectacles including a rim and lens, comprising:
   a peripheral groove formed in the edge of said lens, a first portion of said groove being engaged with a protruding portion of said rim;
   a flexible wire engaged in a second portion of said groove, said wire in said groove retaining said lens against said rim;
   first and a plurality of second engagement means on said rim for holding the respective ends of said wire to said rim;
   third engagement means respectively connected to opposite ends of said wire for connection with said first and a selected one of said plurality of second engagement means, lenses of different perimeters being retained between said wire and said rim by selection of said second engagement means for connection of said wire thereto.

2. A frame for a pair of spectacles as claimed in claim 1, wherein each said third engagement means comprises an enlargement at an end of said wire.

3. A frame for a pair of spectacles as claimed in claim 2, wherein said plurality of second engagement means comprises receptacles on a surface of said rim, said enlargement of said wire being retained in a selected one of said receptacles to form said connection at one end of said wire to said rim, the perimeter of same frame being modified to conform to the perimeter of said lens by selection of said second engagement means for connection of said wire thereto.

4. A frame for a pair of spectacles as claimed in claim 3, wherein said receptacles are recesses opening on the inside of said rim and having a longitudinal axis perpendicular to the inner surface at the side of said rim.

5. A frame for a pair of spectacles as claimed in claim 3, wherein said receptacles are recesses opening on the inside of said rim and having a longitudinal axis inclined at an angle to the inner surface at the side of said rim.

6. A frame for a pair of spectacles as claimed in claim 4 or 5, wherein said rim includes a groove on said inner rim surface, said groove being substantially parallel to the adjacent edge of said lens, said wire resting in said groove when said enlargement of said wire end is seated in a recess.

7. A frame for a pair of spectacles as claimed in claim 6, wherein an opening extends from each of said recesses in said rim through to the outer surface of said rim.

8. A frame for a pair of spectacles as claimed in claim 6, wherein said recesses are L-shaped, said enlargement of said wire nesting against a shoulder formed by said L-shape in said rim recess to hold said wire, said wire being disengaged from said recess by lifting said enlargement clear of said shoulder.

9. A frame for a pair of spectacles as claimed in claim 4, wherein the inside of said rim is staked to retain said wire enlargement in said recess.

10. A frame for a pair of spectacles as claimed in claim 4, and further comprising a pin extending from the outer surface of said rim into each of said recesses, and an opening through said enlarged end of said wire, said opening being adapted to slide over said pin to provide engagement between said wire and said rim.

11. A frame for a pair of spectacles as claimed in claim 8, and further comprising a split collar surrounding a portion of said wire adjacent said enlargement, said collar nesting against said shoulder and being positioned between said enlargement and said shoulder, the length of said wire extendable externally of said recess being reduced by the length of said collar, the length of said collar differing among a plurality of interchangeable collars.

12. A frame for a pair of spectacles as claimed in claim 11, wherein said collar is elastic and includes a longitudinal split groove, said collar being attached to said wire or detached from said wire by elastically enlarging said split groove.

13. A frame for a pair of spectacles as claimed in claim 4, wherein an adapter is fitted into each said recess from the inner surface of said rim, said adapter including a socket for retaining said enlarged wire end and a slot for guiding said wire, said wire being connected to said rim by attachment to said adapter.

14. A frame for a pair of spectacles as claimed in claim 4, wherein an adapter is fitted into each said recess from the outer surface of said rim, said adapter including a socket for retaining said enlarged wire end and a slot for guiding said wire, said wire being connected to said rim by attachment to said adapter.

15. A frame for a pair of spectacles as claimed in claim 1, wherein said third engagement means comprises an enlargement at the end of said wire, and said first engagement means includes a fixture, said fixture being releasably engaged to said rim, said fixture having an opening passing therethrough, said opening having a counterbore, said wire passing through said opening, said enlarged wire portion being constrained by the shoulder formed by said counterbore, the length of said wire extending from said fixture being determinable by the depth of said counterbore, the depth of said counterbore differing among a plurality of interchangeable fixtures.

16. A frame for a pair of spectacles as claimed in claim 1, wherein the first engagement means includes a fixture, said fixture being releasably engaged to said rim, said fixture having an opening passing therethrough, said wire passing through said opening, and said third engagement means comprising a wedge forced into said opening with an end of said wire, said wire being retained in said opening by action of said wedge.

17. A frame for a pair of spectacles as claimed in claim 16, wherein said wedge is removable for release of said wire and from said opening.

18. A frame for a pair of spectacles as claimed in claim 1, wherein said third engagement means comprises an enlargement at the end of said wire and a split collar surrounding a portion of said wire adjacent said enlargement, and said first engagement means includes a fixture, said fixture being releasably engaged to said rim, said fixture having an opening passing therethrough, said opening having a counterbore, said wire passing through said opening, said collar being constrained by the shoulder formed by said counterbore, the length of said wire extending from said fixture being determinable by the length of said collar, collar length differing among a plurality of interchangeable collars.

19. A frame for a pair of spectacles as claimed in claim 18, wherein said collar is elastic and includes a longitudinal split groove, said collar being attached to said wire or detached from said wire by elastically enlarging said split groove.

* * * * *